(No Model.)

E. FARNSWORTH.
BICYCLE SUPPORT.

No. 571,433. Patented Nov. 17, 1896.

Witnesses
C. H. Hill
C. A. Broeffle

Inventor
Ezra Farnsworth
By Fletcher Cairns & Rockwood
his Attorneys.

UNITED STATES PATENT OFFICE.

EZRA FARNSWORTH, OF MINNEAPOLIS, MINNESOTA.

BICYCLE-SUPPORT.

SPECIFICATION forming part of Letters Patent No. 571,433, dated November 17, 1896.

Application filed April 3, 1896. Serial No. 586,112. (No model.)

*To all whom it may concern:*

Be it known that I, EZRA FARNSWORTH, a citizen of the United States, residing at the city of Minneapolis, county of Hennepin, and State of Minnesota, have invented certain new and useful Improvements in Bicycle-Supports, of which the following is a specification.

My invention relates to bicycle-supports designed to sustain a bicycle in a substantially upright position when the rider has dismounted from his wheel; and the objects of my invention are to produce a support which will so hold the bicycle firmly, which will provide convenient means for locking the wheel, and which will be of such form that the support can be conveniently carried upon the wheel when not in use. I attain these objects by the mechanism illustrated in the accompanying drawings, in which—

Figure 1:
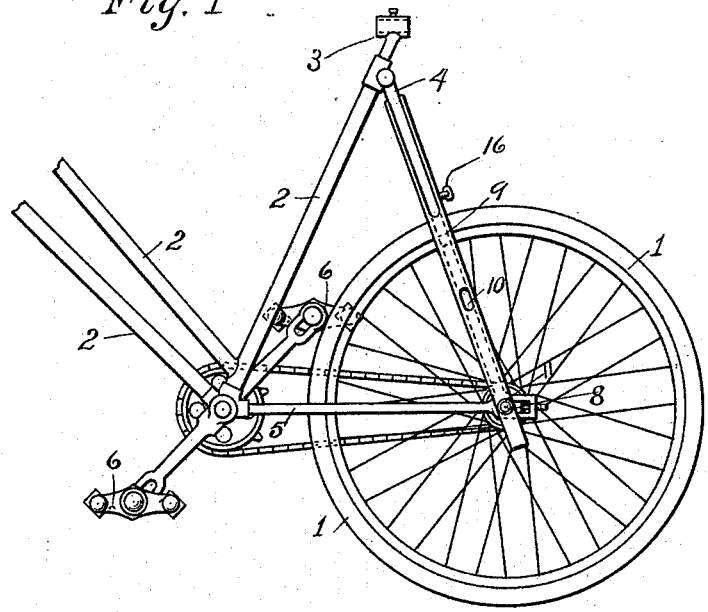
Figure 2:
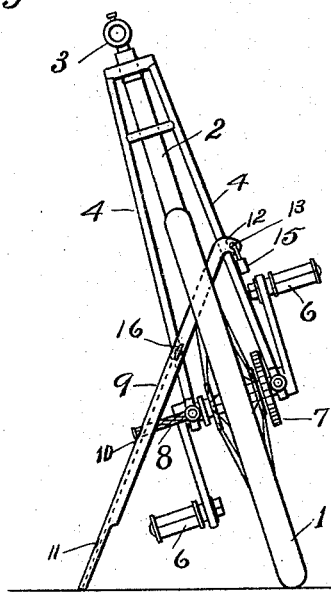
Figure 3:
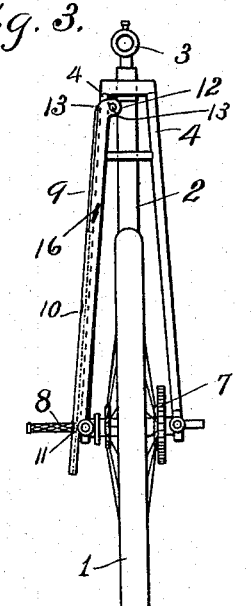
Figures 4, 5, 6:
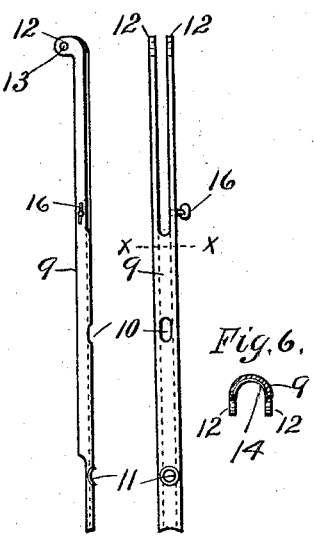

Figure 1 is a side elevation showing the rear wheel and portion of the frame of a bicycle having my support secured to it for the purposes of transportation. Fig. 2 is a rear elevation of a bicycle, showing the support in use. Fig. 3 is a rear elevation showing the support as in Fig. 1. Fig. 4 is an edge view of the support detached from the wheel. Fig. 5 is a front view of the same. Fig. 6 is a cross-section of the support through the line $x\,x$, Fig. 5, looking toward the upper end of the support.

Similar numerals refer to similar parts throughout the several views.

The rear wheel of the bicycle is represented by 1. 2 is the frame of the bicycle; 3, the portion of the frame upon which the saddle rests; 4, the rear braces of the wheel; 5, the fork; 6, the pedals; 7, the sprocket-wheel, and 8 the step. The support 9 is of semicircular form in cross-section, as shown in Fig. 6, and is provided with two holes 10 and 11. The upper end of the support 9 is bifurcated, as shown in Figs. 1 and 5, each prong of which bifurcated portion is provided with a lug 12, through which a hole 13 passes. The inner surface of the support will be preferably lined with cloth 14, Fig. 6.

When the rider desires to leave his bicycle standing, he will run the bifurcated portion of the support 9 between the spokes of the rear wheel in such manner that the rear braces 4 of the bicycle will be received between the prongs of the bifurcated portion of the support. The step 8 will be passed through the hole 10 and the padlock 15 through the holes 13. In this manner three points of support and contact are effected between the support and the bicycle, namely, upon the step 8 and at the two braces 4, and the bicycle is held firmly in a position slightly inclined from the perpendicular, the lower end of the support resting upon the ground. The thumb-screw 16 may be used to insert by screwing laterally through the support against the side of the brace 4, as shown in Fig. 2, thereby lending additional firmness to the support. In case the bicycle does not have the step 8 the holes 10 and 11 may be omitted.

When the support is not in use, it will be mounted upon the wheel by inserting the step 8 through the hole 11, and the support will clamp about the brace 4, as shown in Fig. 3. The thumb-screw 16 may be used also to hold the support in position upon the brace for purposes of transportation, while the inner lining of cloth 14 will prevent rattling and will also prevent scarring of the braces by contact with the metal support. In this manner I produce a most practical form of bicycle-support, one which is light, may be transported readily upon the wheel without being in the way, and is always ready for use both for supporting the bicycle and to use in locking the same.

What I claim as new, and desire to secure by Letters Patent, is—

1. The combination with a bicycle of a support-bar having one end thereof bifurcated so as to engage the frame of the bicycle and the spokes of the wheel and means for fastening the support to the frame substantially as shown and described.

2. The combination with a bicycle, of a support-bar semicircular in cross-section, and having one end thereof bifurcated so as to engage the frame of the bicycle and the spokes of the wheel, and means for fastening the support to the frame when not in use, substantially as set forth.

3. The combination with a bicycle of a support-bar having one end bifurcated for engaging the frame of the bicycle and the spokes of the wheel, means for locking the same while so engaged, and means for securing the same to the frame of the wheel when not in use, substantially as specified.

4. The combination with the brace 4 and step 8 of a detachable support-bar which is semicircular in cross-section for embracing the brace 4 and which is provided with the holes 10 and 11, substantially as shown and described.

5. The combination with a bicycle of a support-bar having one end bifurcated for engaging the frame of the bicycle and the spokes of the wheel, the lugs 12, the lock 15 and the set-screw 16, substantially as set forth.

EZRA FARNSWORTH.

Witnesses:
 CHAS. S. CAIRNS,
 ETTA M. CALL.